United States Patent
Jia et al.

(10) Patent No.: US 9,016,581 B2
(45) Date of Patent: Apr. 28, 2015

(54) SCENARIO WINDOWING FOR EXPEDITED DECODING OF MULTIPLE BARCODES

(75) Inventors: Chun Jia, Manlius, NY (US); Daniel Francis Godici, Brewerton, NY (US)

(73) Assignee: Jadak, LLC, North Syracuse, NY (US)

( * ) Notice: Subject to any disclaimer, the term of this patent is extended or adjusted under 35 U.S.C. 154(b) by 211 days.

(21) Appl. No.: 13/562,928

(22) Filed: Jul. 31, 2012

(65) Prior Publication Data

US 2014/0034736 A1 Feb. 6, 2014

(51) Int. Cl.
*G02B 26/10* (2006.01)
*G06K 7/14* (2006.01)

(52) U.S. Cl.
CPC ............ *G06K 7/1443* (2013.01); *G06K 7/1447* (2013.01)

(58) Field of Classification Search
USPC ................ 235/462.25, 462.41, 462.1, 462.11
See application file for complete search history.

(56) References Cited

U.S. PATENT DOCUMENTS

| | | | | |
|---|---|---|---|---|
| 5,247,166 A | * | 9/1993 | Cannon et al. | 250/208.1 |
| 5,304,787 A | * | 4/1994 | Wang | 235/462.09 |
| 2007/0158428 A1 | * | 7/2007 | Havens et al. | 235/462.45 |
| 2010/0084470 A1 | * | 4/2010 | Scott et al. | 235/462.09 |
| 2013/0112752 A1 | * | 5/2013 | Negro et al. | 235/472.01 |

* cited by examiner

*Primary Examiner* — Ahshik Kim
(74) *Attorney, Agent, or Firm* — David L. Nocilly; Bond Schoeneck & King, PLLC

(57) ABSTRACT

A process system for expediting the interpretation of information encoded or contained with an optical image capture for barcode decoding and machine vision applications that uses one or more each of which define one or more windows arranged according to equal rows or columns in the captured image that will be further processed to extract encoded or designer information. The scenarios and windows contained therein may be defined in memory and then recalled as needed based on the particular application so that multiple barcodes contained within a single image may be efficiently and expeditiously decoded.

10 Claims, 4 Drawing Sheets

SCENARIO WINDOWING FOR EXPEDITED DECODING OF MULTIPLE BARCODES

BACKGROUND OF THE INVENTION

1. Field of the Invention

The present invention relates to image processing and, more particularly, to a system and method for expediting the decoding of images having multiple regions with encoded information.

2. Description of the Related Art

In conventional barcode readers having optical imagers, an image of a target is acquired by an optical imager, such as a CCD or CMOS, and then analyzed to determine whether a barcode is present in the acquired image. Typically, the image is scanned by software programmed into a microcontroller interconnected to the imager to detect the characteristic patterns of a one or two dimensional barcode. Unfortunately, when the acquired image contains multiple barcodes along with other information, conventional decoding processing is not able to expeditiously locate and decode the encoded information as the entire image much be searched and processed in order to locate and decode the requisite information. In fact, conventional barcode decoders will only locate and decode a single barcode in an image. When there are multiple barcodes in the image, the decoder will simply decode the first barcode that it locates. Even if the decoding algorithm is repeated, the decoder may decode the same barcode again or another one in the image, but only one. Thus, repeating decoding operations on an image does not necessarily result in the interpretation of every barcode in the image. In addition, the barcode location process of conventional barcode decoding algorithms is somewhat time consuming and thus is not useful in applications where fast response times are required. This problem is further exacerbated when the image contains additional information of interest, such as a target object to be recognized through machine vision processing, as the image complexity adversely impacts barcode location

BRIEF SUMMARY OF THE INVENTION

The present invention provides a system for expediting the interpretation of information encoded or contained with an optical image capture for barcode decoding and machine vision applications. After an image is captured, the image is processed using one or more scenarios, each of which comprise one or more windows that define regions of interest in the captured image that will be further processed to extract encoded or designer information. The scenarios and windows contained therein may be defined by commands and therefore created or adjusted based on the particular application using the imager. The present invention thus provides an expedited method for identifying and interpreting regions of interest from a captured imager and also provides a system that can be readily adapted and configured on an on demand basis to allow for decoding of multiple barcodes located within a single captured image.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
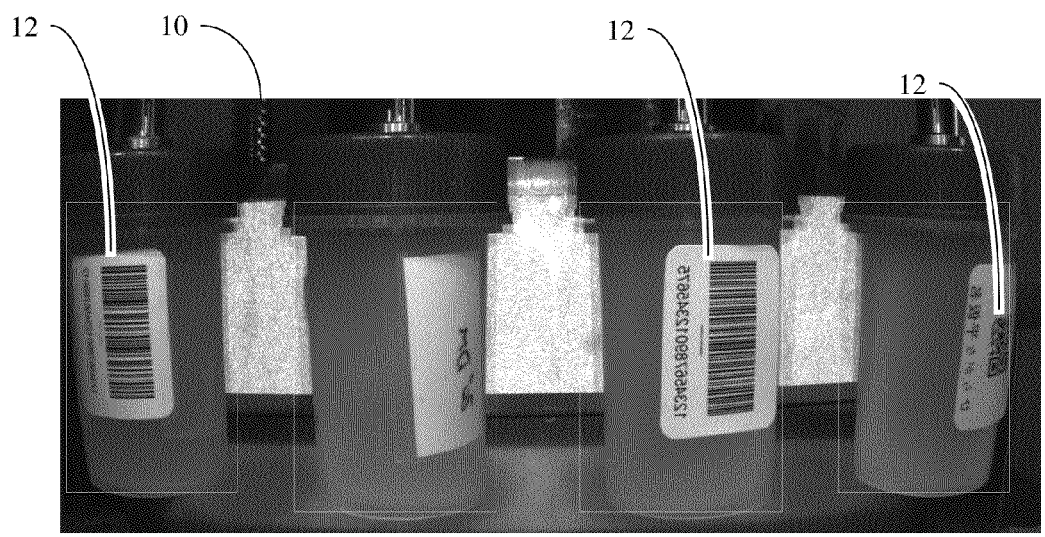
FIG. 1 is an image of a series of targets having multiple barcodes for decoding according to the present invention.

Referring now to the drawings, wherein like reference numerals refer to like parts throughout, there is seen in FIG. 1 an image 10 of a target or series of targets that have been captured by an optical imager and includes multiple barcodes 12 position thereon that are desired to be decoded. Conventional barcode decoding processing is only capable of interpreting one barcode and, more problematically, just the first barcode that happens to be located within the image. The present invention comprises a method to ensure that each and every barcode within the image is efficiently and expeditiously decoded.

It should be recognized by those of skill in the art than any off-the-shelf optical image may be used in combination with the present invention. For example, Honeywell Imaging and Mobility of Skaneateles Falls, New York offers a 5×80 series of imagers are capable of scanning and decoding most standard barcodes including linear, stacked linear, matrix, OCR, and postal codes. Other acceptable optical imaging platforms may also include the EA15 and XA21 imagers available from Intermec Technologies Corporation of Everett, Wash., or any custom imaging packaging sold commercially for incorporation into machine vision or optical imaging systems. Although these images include on-board processing that can be programmed to implement the present invention, a captured image may be exported to an external microcontroller programmed to implement the present invention, such as a microcontroller having on-chip peripherals like a central processing unit, Flash EEPROM, RAM, asynchronous serial communications interface modules, serial peripheral interfaces, Inter-IC Buses, timer modules, pulse modulators with fault protection modules, pulse width modulators, analog-to-digital converters, and digital-to-analog converters.

Figure 2:
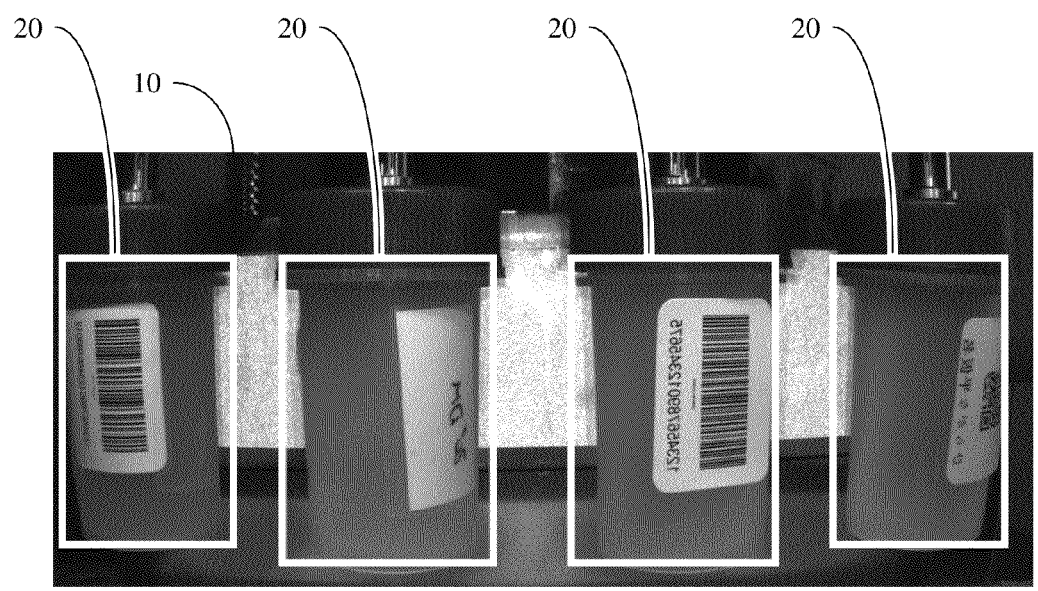
FIG. 2 is an optical image taken of a series of targets and including a series of decode windows according to the present invention.

The microcontroller associated with the imager may be programmed to implement a scenario windowing process according to the present invention that expedited barcode processing and ensure than all barcodes within an image are decoded. As seen in FIG. 2, optical image 10 having multiple barcodes 12 therein may be divided to identify individual decode windows 20, each of which encloses one of the individual barcodes 12 to be targeted for decoding operations. If windows 20 are non-uniform, i.e., they are of differing sizes such that they do not fall evenly with a series of spaced rows or columns, windows 20 are segregated into different scenarios, each of which includes any windows 20 are uniform and fall within an evenly spaced series of columns or rows. The decision as to how many scenarios are need to segregate windows 20 is based upon the arrangement of the barcodes to be decoded and how those barcodes can be arranged into a series of rows or column that fully enclose the target barcodes. Multiple individual scenarios are needed when the barcodes contained within of image do not otherwise fit precisely within a single arrangement of columns or rows.

Figure 3:
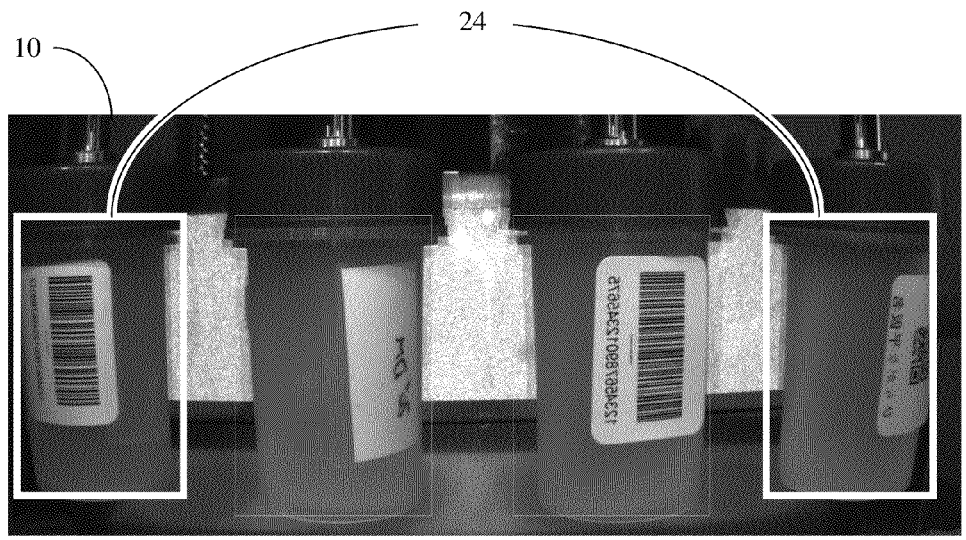
FIG. 3 is an optical image that has been divided into a first scenario for decoding according to the present invention.
Figure 4:
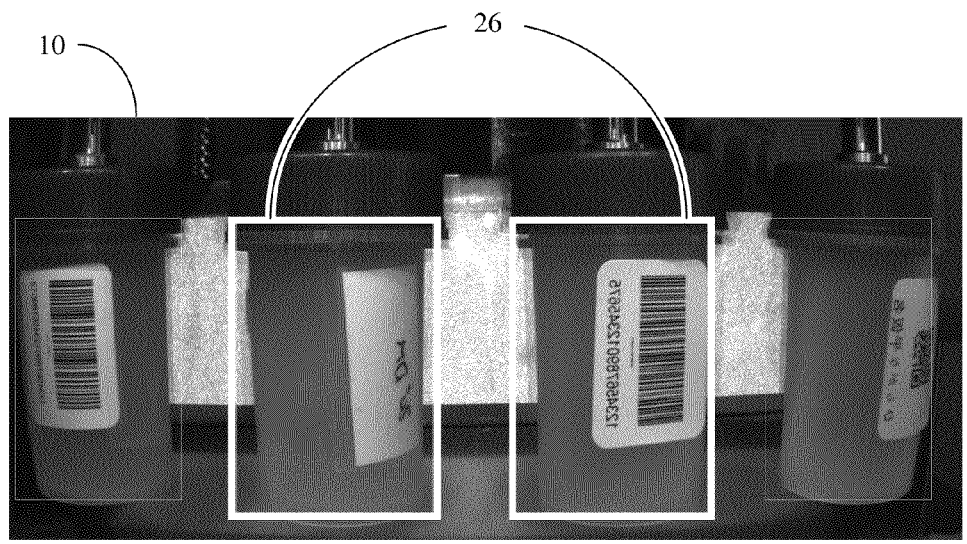
FIG. 4 is an optical image that has been divided into a second scenario for decoding according to the present invention.

In the example of FIG. 2, there are at least three barcodes contained in the image that fall within four discrete regions. In order to more expeditiously decode any barcodes falling within these four discrete regions, the image must be conceptually divided into two scenarios because the first and last windows 20 are of different size than the second and third windows, i.e., two scenarios are necessary to create a uniform pattern of columns or rows, where those columns or rows will fully enclose the target barcodes. As illustrated in FIG. 3, a first scenario 24 is defined to contain first and fourth decode windows 20 and, as illustrated in FIG. 4, a second scenario 26 is defined to uniformly contain the second and third decode windows 20.

Once the appropriate number of scenarios are defined, the scenarios and their respective window arrangement may be saved in local memory. For example, a byte string providing the width, the height, the x value of the top left corner of the first window, the y value of the top left corner, the number of rows, the number of columns, the horizontal spacing between each window, and the vertical spacing between each window may be used. This nomenclature is significantly more efficiently for saving the location information, as compared to having to define each window of each scenario using (x,y) coordinates. As processing speed is critical in machine vision applications, including barcode interpretation, expediting the scenario definitional and recall process is advantageous particularly when multiple barcodes must be decoded within a given time period or before the decoding algorithm times out.

Figure 5:
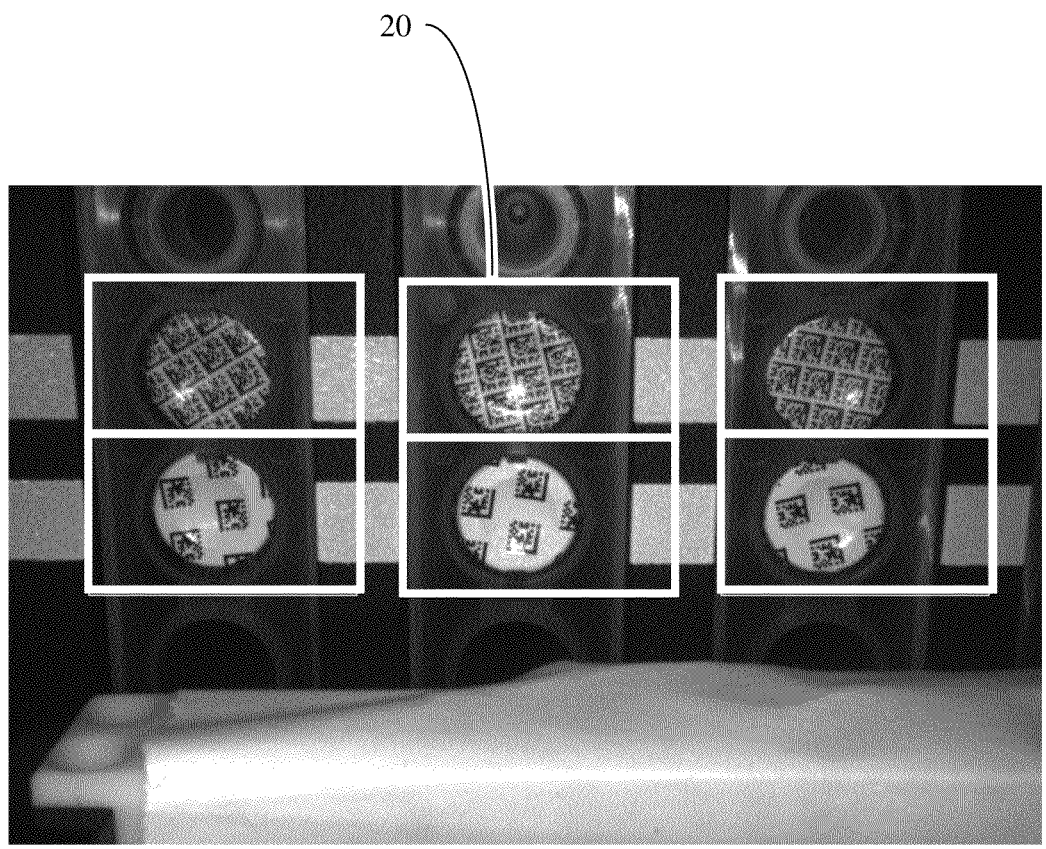
FIG. 5 is an optical image having six windows defined by a scenarios according to the present invention.

As seen in FIG. 5, this definitional nomenclature can identify a scenario with six evenly spaced windows 20 more expeditiously than conventional grid coordinates as only the first window and number of columns and rows needs to be described, rather than the coordinates for all six windows, thereby improving processing speed which is of paramount importance in machine vision processing applications.

It should be recognized by those of skill in the art that a system implementing process 16 according to the present invention is preferably pre-calibrated prior to barcode decoding to define the appropriate number of scenarios, and windows therein, that may be required for barcode decoding in the future. Any number of scenarios may then be called during actual processing of images in a live application to expedite barcode decoding operations.

Figure 6:
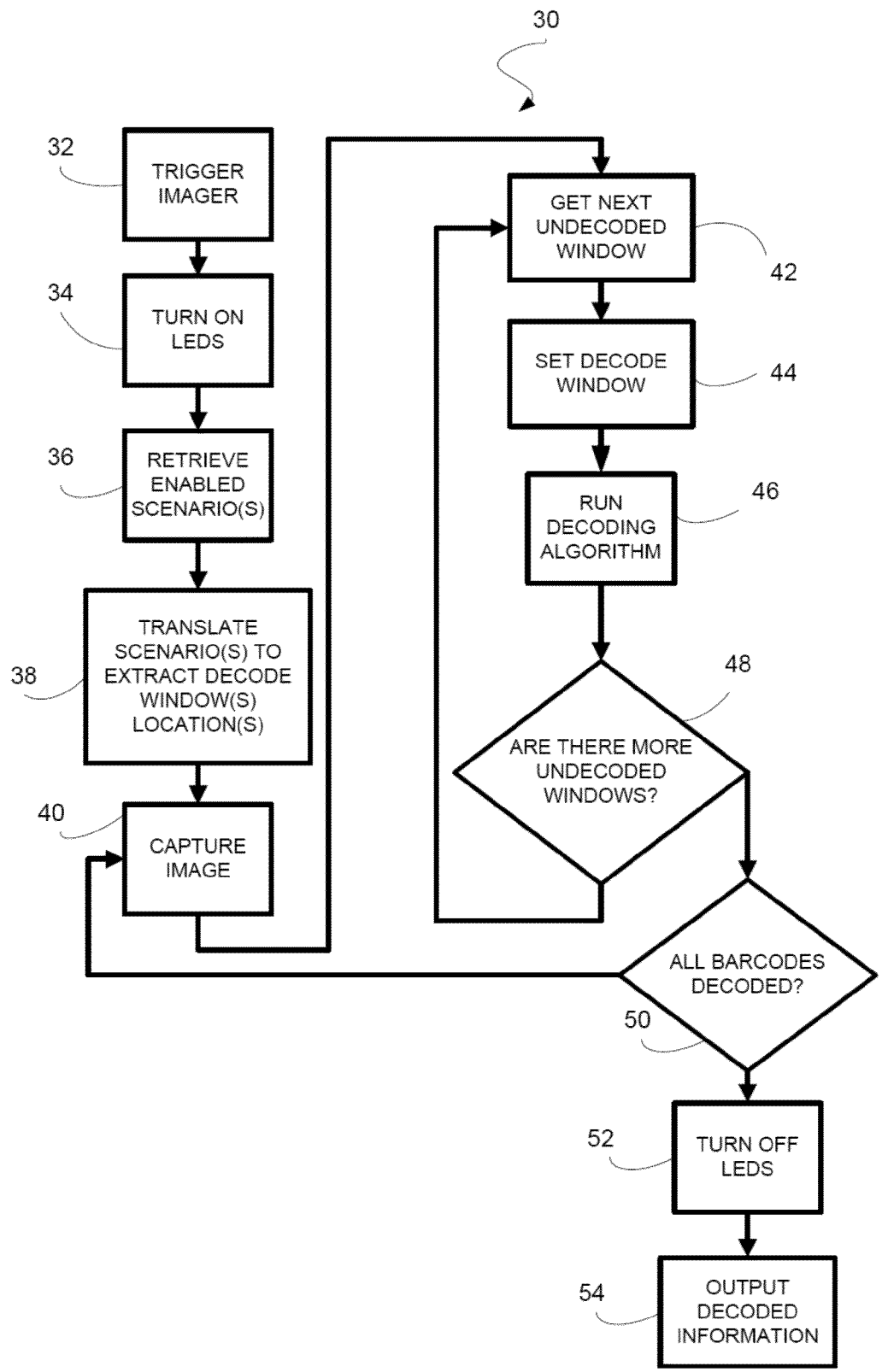
FIG. 6 is a flowchart of a method of interpreting multiple barcodes.

Referring to FIG. 6, a method of interpreting multiple barcodes 30 according the present invention begins with the triggering of an imager 32 and turning on of illumination 34. Notably, triggering can occur manually, via a host system sending a trigger command, or by an object being presented to an imager. After triggering 32 and illumination 34, all enabled scenarios are retrieved 36, such as from a database (not shown). For example, a host command send to imager or associated microcontroller may have designated that two pre-configured scenarios are to be employed. If so, the enabled scenarios are retrieved 36. The scenarios are then translated 38 from the stored parameters, such as the byte string identified above, into the appropriate location coordinates for each window of every enabled scenario that can be understood by the particular barcode decoding algorithm being used. Next, an image is captured 40, and then the one of the window locations of those that have been retrieved and translated at steps 36 and 38 is used to set a decode window 44. Preferably, defined scenarios are processed in sequential order and multiple windows in a scenario are process from top down and from left to right. The decode window in then decoded by running the decode algorithm 46. A check is then performed to determine whether there are any more windows from steps 36 and 38 to be decoded and, if so, control returned to step 42. Preferably, all scenario windows are processed in this manner using a single image. In the event that the decode algorithm has a timeout process or to ensure full processing, a further check is performed 50 to determine whether every expected barcode has been decoded may be performed, i.e., is the number of successful decodes equal to the number of windows from steps 36 and 38. If so, the LEDs can be turned off 52 and all decoded information can be sent output 54, such as to a host system. Decoded data may be returned in the order of the scenarios/windows processed and be separated by a configurable delimiter. If no at check 50, however, a new image may be captured by returning control to step 40. Steps 52 and 54 can, of course, be performed immediately if check 48 determines there are no undecoded windows to enhance the speed of process 30 and limit processing to a single image.

What is claimed is:

1. A system for decoding multiple barcodes, comprising: an optical imager; a barcode decoder having a barcode decoding algorithm capable of decoding a given location within an optical image captured by said imager a microcontroller associated with said imager, wherein said microcontroller is programmed to recall from memory at least one scenario defining at least one window as having a predetermined location, to translate said at least one scenario to extract the predetermined location of said at least one window, to initiate the capturing of a digital image containing a plurality of barcodes positioned therein, and to send said predetermined location to a barcode decoding algorithm so that said algorithm only decodes said predetermined location within said captured digital image.

2. The system of claim 1, further comprising a plurality of scenarios, where in each scenario includes a plurality of windows.

3. The system of claim 2, wherein said microcontroller is programmed to sequentially send said predetermined location for each of said plurality of windows in each of said plurality of scenarios to said barcode decoder.

4. The system of claim 2, wherein said plurality of scenarios are each defined by a plurality of equal columns, each of which includes the entirety of one of said plurality of windows.

5. The system of claim 2, wherein said plurality of scenarios are each defined by a plurality of equal rows, each of which includes the entirety of one of said plurality of windows.

6. A method of decoding multiple barcodes, comprising the steps of:
recalling from memory at least one scenario defining at least one window as having a predetermined location;
translating said at least one scenario to extract the predetermined location of said at least one window;
capturing a digital image containing a plurality of barcodes positioned therein;
sending said predetermined location to a barcode decoding algorithm; and
decoding only said predetermined location within said captured digital image.

7. The method of claim 6, wherein the step of recalling from memory at least one scenario defining at least one window as having a predetermined location comprises recalling a plurality of scenarios, each of which defines a plurality of windows.

8. The method of claim 7, wherein the step of sending said predetermined location to a barcode decoding algorithm comprises sending said predetermined location for each of said plurality of window in each of said plurality of scenarios.

9. The method of claim 7, wherein said plurality of scenarios are each defined by a plurality of equal columns, each of which includes the entirety of one of said plurality of windows.

10. The method of claim 7, wherein said plurality of scenarios are each defined by a plurality of equal rows, each of which includes the entirety of one of said plurality of windows.

\* \* \* \* \*